United States Patent [19]

Harman

[11] Patent Number: 5,208,523
[45] Date of Patent: May 4, 1993

[54] STEPPER MOTOR WITH VERNIER CONTROL MODE

[75] Inventor: Jefferson H. Harman, Thousand Oaks, Calif.

[73] Assignee: Wangtek, Inc., Simi Valley, Calif.

[21] Appl. No.: 850,331

[22] Filed: Mar. 10, 1992

[51] Int. Cl.⁵ .............................................. G05B 19/40
[52] U.S. Cl. ...................................... 318/685; 318/696
[58] Field of Search ........................................ 318/685

[56] References Cited

U.S. PATENT DOCUMENTS

4,618,808 10/1986 Ish-Shalom et al. ................ 318/685
4,788,482 11/1988 Tachibana et al. .................. 318/685

Primary Examiner—William M. Shoop, Jr.
Assistant Examiner—Karen Masih
Attorney, Agent, or Firm—Robbins, Dalgarn, Berliner & Carson

[57] ABSTRACT

A stepper motor in a magnetic tape cartridge head positioning system applies vernier control to achieve a final target after a preliminary target has been achieved by stepping. The vernier control is provided by a closed loop servo system in which current is applied to stator coils selected so that the target is at a torque maximum rather than at a torque null. Current proportional to a servo error signal is applied to selected stator coils so that the torque is sufficiently linearly related to position to permit classical linear servo analysis for the design of a stable, non-oscillating system. An example of stator coil selection for advancing and retarding a permanent magnet stepper motor operated in eight half steps is provided below in Table 1.

27 Claims, 4 Drawing Sheets

STEPPER MOTOR WITH VERNIER CONTROL MODE

BACKGROUND OF THE INVENTION

1. Field of the Invention

This invention relates generally to the field of position control, and more particularly to the use of stepper motors for fine position control.

2. Description of the Prior Art

Many tasks require fine position control, such as the positioning of a sensor such as a read/write head assembly in a magnetic tape or disk drive. Stepper motors are electromechanical devices developed for use in accurate and repeatable positioning systems which can be moved or stepped along discrete step or target positions in response to electrical pulses. Stepper motors include periodic stator magnet structures energizable by electric coils arranged so that the proper sequencing of coil energizations causes the periodic rotor magnet structure to be moved in a stepwise fashion from one target position to the next. Although there generally are position errors in positioning the rotor at each step, these errors are non-cumulative.

A typical stepper motor may have 24 steps per rotation, providing target positions at every 15° of rotation. Stepper motors are commercially available which can provide full step rotations as small as 0.9°. One approach to providing finer position control than the full step of a stepper motor has been the development of the technique known as microstepping in which the rotor is positioned in discrete sub-steps within each full step. In full step operation, only one coil would typically be energized at a time. In microstepping operation, two coils may be energized so that a new target position is created between the target positions of either coil energized individually. If the coils are energized equally—that is, with equal currents—the microstep position is midway between the full step positions.

By using predetermined unbalanced currents to energize the two coils, multiple microsteps within each full step can be achieved. In a microstepping operation providing eight microsteps per full step, for example, a 24 step stepper motor has 8×24 or 192 steps. This increases the stepper motor resolution from 24 full steps of 15° each to 192 microsteps of only 1.875° each. The relationship between current and the microstep target position is non-linear, so the exact coil energization currents required for microstepping are typically stored in and read from a look-up table.

Conventional stepper motor systems, whether in full step or microstepping operation, provide only a finite number of discrete, spatially separated target positions in response to pulse actuation and are therefore considered digital positioning systems. Furthermore, at each target, there is generally some positional error that cannot be controlled. The torque delivered in a conventional stepper motor is proportional to the product of the current in the coil and the sine of the product of the angular distance of the rotor from the target position with the full number of steps available from the stepper motor. The torque is therefore non-linearly proportional to displacement, with a torque null at the target position. The torque null at the target position results in poor performance in the exact position in which high performance is most desired.

This non-linear relationship between torque and position makes a conventionally driven stepper motor a poor candidate for improving position control by analog servo control because classical linear servo analysis is valid only for linear systems. In addition, the torque null at the target position also makes a conventionally driven stepper motor a poor candidate for improvement by analog servo control because the target positions are at torque nulls. The resultant small signal gain approaches zero in the vicinity of the target, making conditionally stable servo systems unattractive because of the high potential for oscillation about the target.

What is needed is a technique for permitting finer position control from stepper motors than is available with conventional full step and microstepping operations.

SUMMARY OF THE INVENTION

The preceding and other shortcomings of prior art stepper motor position control systems are addressed and overcome by the present invention that provides techniques for operating a stepper motor system in a vernier control mode—after a preliminary target has been achieved in step control mode—in which the final target is at a torque maximum rather than at a torque null and in which the torque is sufficiently linearly related to position so that classical linear servo analysis is applicable to permit the design of stable, non-oscillating systems.

The rotor of the stepper motor is moved by conventional, open loop stepping operation to the vicinity of the preliminary target after which coil currents are controlled by a servo loop error signal. The currents are applied to stator coils selected so that the torque, and therefore the current in the coil, is substantially linearly proportional to displacement. In particular, for vernier control about preliminary target, the stator coil or coils defining the preliminary target are de-energized and currents whose magnitudes and polarity are substantially proportional to the magnitude and polarity of the position error are applied to stator coils on either side of the preliminary target. The change from microstepping to vernier control therefore results in shifting the torque null away from the position of the preliminary target to another position a full step away. In other words, the change to vernier control changes the torque displacement relationship from a torque null at the preliminary target to a torque maximum at the desired position. An example of stator coil selection for advancing and retarding a permanent magnet stepper motor operated in eight microsteps is provided below in Table 1.

In a further aspect, the present invention provides a method of positioning a stepper motor by stepping the motor to the vicinity of a preliminary target and then applying closed loop servo control to position the motor to achieve a final target.

In a still further aspect, the present invention provides a stepper motor positioning system having a rotor, a plurality of stator coils, means for stepping the rotor to a preliminary target by energizing one or more stator coils, and means for applying closed loop servo control to position the rotor to a final target.

The foregoing and additional features and advantages of this invention will become further apparent from the detailed description and accompanying drawing figures that follow. In the figures and written description, numerals indicate the various features of the invention, like numerals referring to like features throughout both the drawing figures and the written description.

DETAILED DESCRIPTION OF PREFERRED EMBODIMENT(S)

Figure 1:
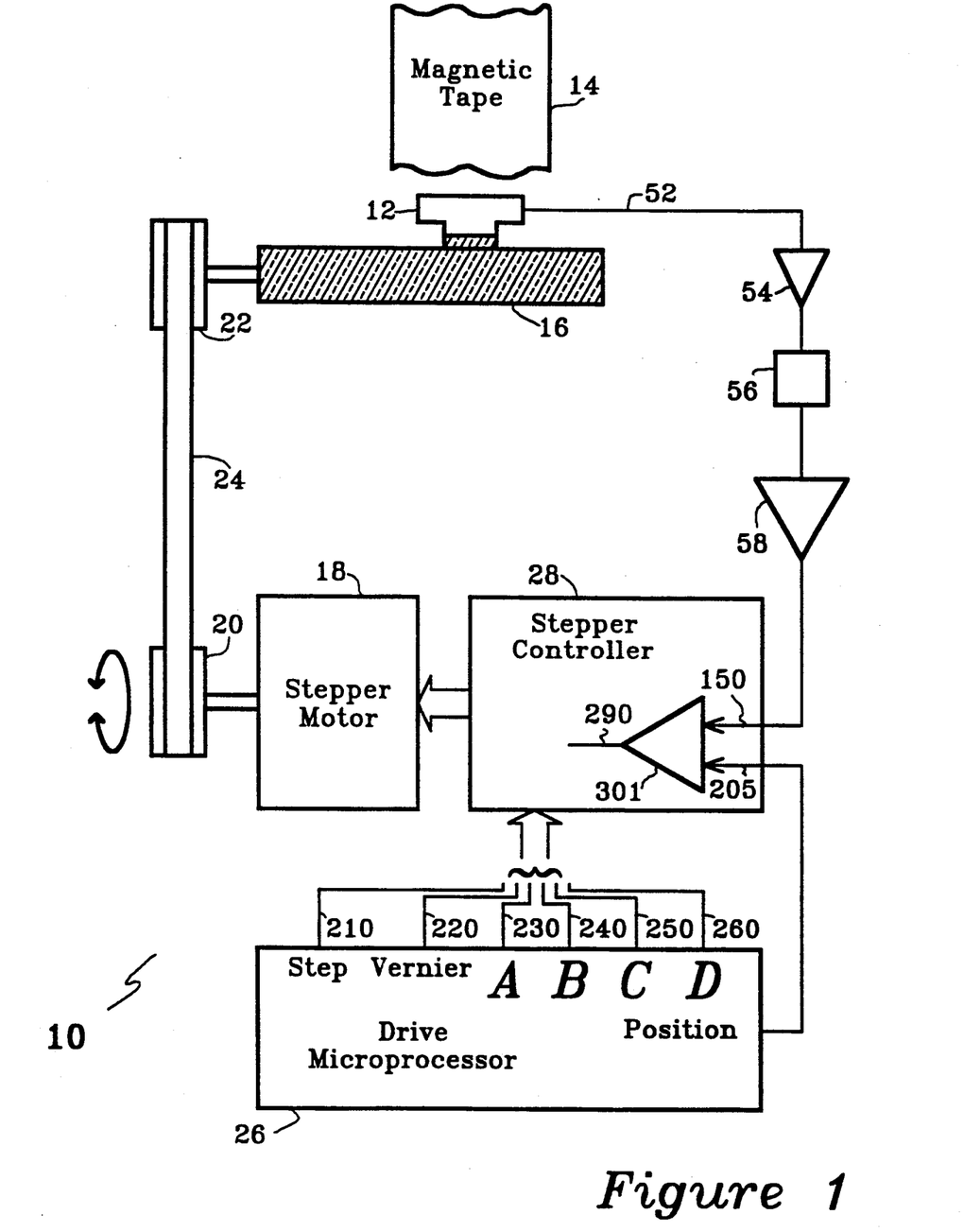
FIG. 1 is a diagram of a portion of a magnetic tape cartridge assembly including track following servo positioning according to the present invention.

FIG. 1 is a diagram of a portion of magnetic tape cartridge assembly 10 including a stepper motor positioning system according to the present invention. Assembly 10 operates to position tape head 12 with respect to magnetic tape contained in a tape cartridge, a portion of which is shown as tape segment 14. Tape head 12 is driven by the rotation of lead screw 16 to the position indicated by position selection signal 205 from drive processor 26, typically perpendicular to the path of tape segment 14. The rotation of lead screw 16 is controlled by stepper motor 18 via pulleys 20 and 22 and belt 24. Stepper motor 18 is driven by drive processor 26 through stepper motor controller 28.

Magnetic tape cartridge assembly 10, as described thus far, may operate in a conventional stepper motor positioning mode as will be described in more detail below with respect to FIG. 2. The description of the remaining portions of magnetic tape cartridge assembly 10 in FIG. 1 will then be completed.

Figure 2:
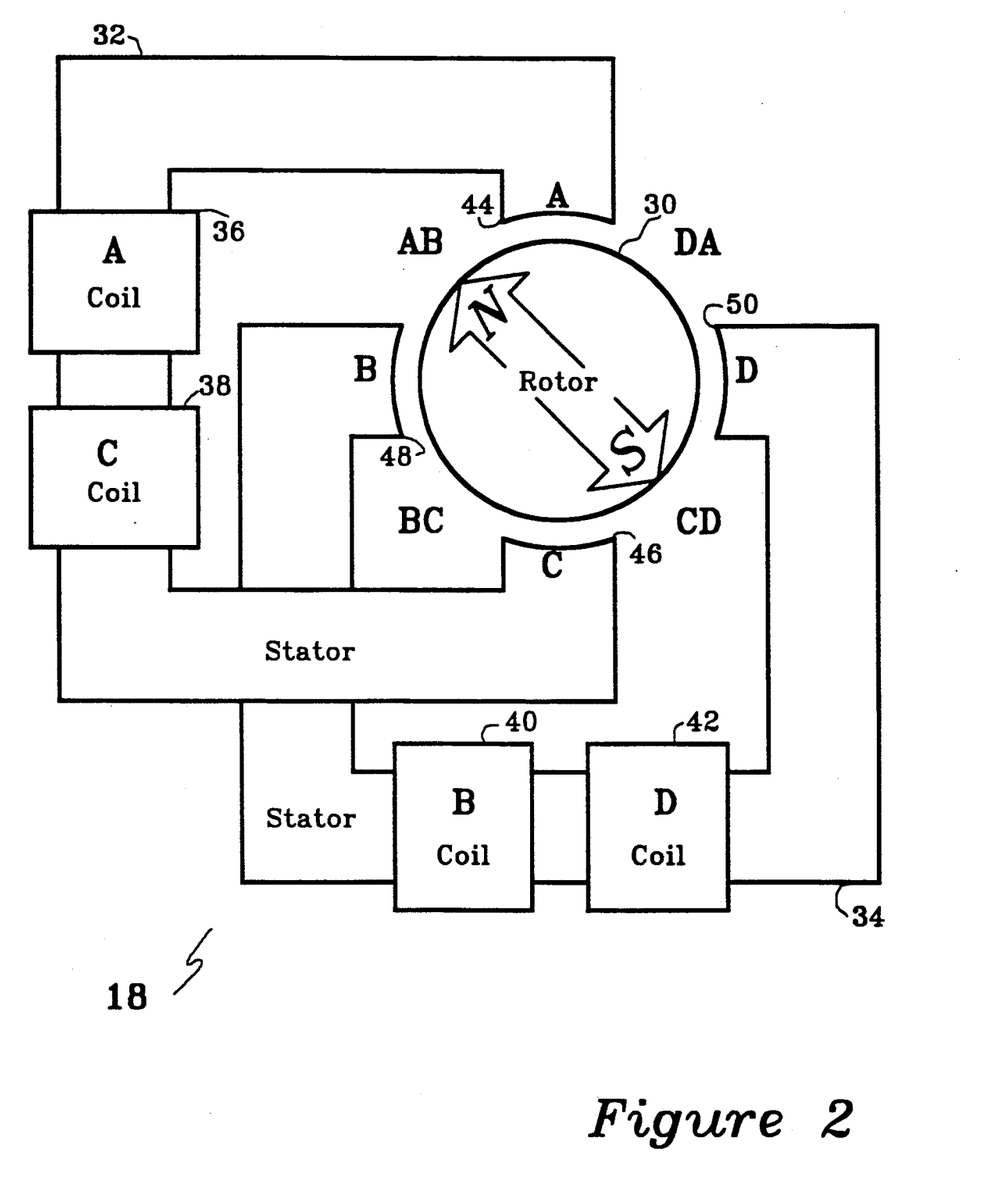
FIG. 2 is a diagram of the stepper motor shown in FIG. 1 illustrating the positioning of the rotor in response to energization of the coils in accordance with the present invention.

Referring therefore now to FIG. 2, stepper motor 18 is shown in greater detail including rotor 30 and stators 32 and 34. Rotor 30 is a permanent magnet rotor shown with the north pole thereof at target position AB. Stator 32 is formed of soft magnetic material and is wound with coils 36 and 38. Stator 34 is formed of soft magnetic material and is wound with coils 40 and 42. Each pair of coils on each stator may conveniently be formed from a center-tapped single coil. Energization of coil 36 causes stator section 44 to become magnetized as a south pole and attract the north pole of rotor 30 to the target position indicated as Target A, while energization of coil 40 causes stator section 48 to become magnetized as a south pole and attract the north pole of rotor 30 to rotate to the target position indicated as Target B. Similarly, energization of coils 38 and 42 cause rotor 30 to rotate Targets C and D at stator sections 46 and 50, respectively. Operation of stepper motor 18 in the sequence described provides four full steps of rotation in a counterclockwise direction in response to four energization pulses. Energization of the coils in the reverse sequence causes clockwise rotation.

Similarly, stepper motor 18 may be operated in a conventional microstepping manner in which rotor 30 is caused to rotate to a target position intermediate the stator pole piece sections. For example, energization of coils 36 and 40 with substantially equal currents causes rotor 30 to rotate from Targets A or B to Target AB, intermediate Targets A and B. Energization of coils 38 and 40 rotates rotor 30 from Targets B or C to Target BC. Similarly, energization of coils 38 and 42 rotates rotor 30 from Target C or D to Target CD and energization of coils 42 and 46 rotates rotor 30 from Targets D or A to Target DA.

Proper sequencing of the energization of the coils causes microstepping of rotor 30 counterclockwise in eight steps of 45° each from Target AB to Targets B, BC, C, CD, D, DA, A. Sequencing of the coils in the reverse order causes microstepping in the clockwise direction.

Stepper motor 18 is shown in FIG. 2 as a two-phase, permanent magnet stepper motor with 1 pole pair per stator coil section for ease of description but a stepper motor having a finer step angle, such as a 15° per step stepper motor, may be preferred in applications such as shown in FIG. 1 for tape head positioning. Similarly, with appropriate control system adjustments, a variable reluctance stepper motor may be used. The above described operation of stepper motor 18 in full step or microstep operation may be performed in the same manner as in a conventional system to provide open loop, discrete step or digital positioning. It should be noted that in the stepping mode of operation, rotor 30 is limited to discrete stepwise motion to a finite number of steps and that—once rotor 30 has reached a target position—rotational torque is at a minimum or null, providing little position holding force.

Stepper motor 18 may in addition—after being coarsely positioned in a full step or microstepping mode to the vicinity of a preliminary target—be more finely positioned in a vernier manner about the step or microstep target in a closed loop servo mode of operation in which the final target is achieved with substantial torque, rather than at a torque null. In accordance with the present invention, rotor 30 may be operated in a manner similar to that of the rotor of a DC or brushless motor and moved in a vernier—rather than stepwise—fashion to any desired rotational position between step targets. In such intermediate positions, rotor 30 is not at a torque null, but rather in the vicinity of a torque maximum, for better holding power and accuracy. The current used to energize the appropriate coils may thereafter be reduced to the minimum current necessary to maintain sufficient torque to keep rotor 30 at the desired target.

Returning now to FIG. 1, vernier control is achieved by closed loop servo control which requires rotor position feedback information. The position information may conveniently be provided by a read/write head contained within tape head 12 reading prerecorded servo tracks on tape segment 14 representing the relative position between the tape and tape head. Conventional position feedback sensors—such as optical shaft encoders—or other optical, magnetic, or capacitive sensors may also be used.

In magnetic tape cartridge assembly 10, position feedback from tape head 12 is provided via head cable 52, through preamp 54 and servo decoder 56, to servo amplifier 58. Servo amplifier 58 produces rotor position signal 150 Which is applied to stepper motor controller 28 together with position selection signal 205 from drive processor 26 to permit servo control of the position of tape head 12 via rotation of lead screw 16 by stepper motor 18. Error signal 290 is generated by comparator 301 in stepper motor controller 28 in response to the difference between rotor position signal 150 from servo amplifier 58 and position selection signal 205 provided by drive processor 26. Stepper motor controller 28 is described below in greater detail with reference to FIG. 3.

Error signal 290 may be an analog or digital proportional control signal, proportional to the difference between position selection signal 205 from drive processor 26 and rotor position signal 150 to provide conventional proportional control. Other conventional control techniques in which error signal 290 would include components related to the integral and/or derivative of this difference may also be used, depending upon the mechanical response of the system being positioned. Stepper motor systems with closed loop vernier position control about microstep targets may conveniently use conventional PID or proportional-integral-derivative control because system linearity is sufficient to permit application of classical linear control system analysis.

After coarse position control is achieved in the open loop, digital stepping or microstepping mode described above, the step mode is disabled and a vernier position mode enabled. In the vernier control mode, energization of the coils is controlled in a feedback or servo loop. In particular, the coils energized in the stepping or microstepping mode are de-energized when the target is achieved and the current in coils on either side of the target are servoed by stepper motor controller 28 in response to error signal 290. The change from coarse position control to vernier control results in changing the currents applied to the coils so that the torque null is moved away from the position of the preliminary target to another position a full step away. In other words, the change to vernier control changes the torque displacement relationship from a torque null at the preliminary target to a torque maximum at the desired position.

Referring now also to FIG. 2 for a more detailed example of the vernier control mode, rotor 30 is shown having achieved a position of Target AB in microstepping operation in response to open loop energization of coils 36 and 40. In this mode of operation, rotor 30 is at a torque null, providing minimum position control with an inherent—though non-cumulative—position error. In order to position rotor 30 in a vernier manner around Target AB, stepper motor controller 28 becomes operative as a closed loop servo system in which currents in coils 38 and 40 are controlled to apply torque to rotor 30 in a counterclockwise directions, i.e. toward Target B at stator section 48 and Target C at stator section 46, while currents in coils 36 and 42 are used to apply an opposing torque to rotor 30 in a clockwise direction, i.e. toward Target D at stator section 50 and Target A at stator section 44.

To simplify the following explanation, a convention will be followed in which each of the coils in stepper motor 18 is designated by the letter corresponding to the full step target position achieved if that coil is energized in open loop operation. That is, coils 36, 38, 40 and 42 are designated as coils A, C, B, and D, respectively, as shown in FIG. 2. Similarly, the target positions are designated by the coils, or pair of coils, which must be energized in an open loop fashion to achieve these targets. In this manner, Targets A, B, C, and D—which are achieved by energizing coils 36, 40, 38 and 42, respectively—are designated as coils A, B, C and D. In this manner, Targets AB, BC, CD and DA—which are each achieved by energization of a pair of coils—are designated by the letters corresponding to the coils in each pair, e.g. as coils AB, BC, CD and DA, respectively.

The same convention is used to designate coils and coil pairs in which the current is controlled in a closed loop fashion to servo rotor 30 in the vernier control mode. In the above example, in which vernier control of rotor 30 about Target AB is achieved by torque applied by currents in coil pair 40 and 38 opposing the torque applied by currents in coil pair 36 and 42, the designation convention may be used to describe the same vernier control of rotor 30 about nominal target coil AB by the opposition of the torque applied by counterclockwise or advance coil BC to the torque applied by clockwise or retard coil DA.

The nominal, advance and retard coil designations for vernier positioning of each of the eight microsteps available from stepper motor 18 are shown as NOMCOIL, ADVCOIL, and RETCOIL, respectively, in Table 1 as follows:

TABLE 1

| STEP NO. | NOMCOIL | ADVCOIL | RETCOIL |
|---|---|---|---|
| 0 | A | B | D |
| 1 | AB | BC | DA |
| 2 | B | C | A |
| 3 | BC | CD | AB |
| 4 | C | D | B |
| 5 | CD | DA | BC |
| 6 | D | A | C |
| 7 | DA | AB | CD |

The torques produced by these servo currents in the advance or retard coils are proportional to the product of the current amplitude and the cosine of the product of the steps per rotation and the angle between the rotor position and the energized coil. When this product is 45°, for example, 70.7% of maximum torque for a given current is produced, and at 60°, 50% of maximum torque is produced. This relationship between current and torque is sufficiently linear for positions within about two-thirds of a step that classical linear servo analysis techniques are applicable for the design of stable systems. For positions beyond this dynamic range, servo control of rotor 30 should be shifted to an alternate pair of coils for which rotor 30 is within this dynamic range.

In this closed loop system—as is typical for conventional linear position servo loops—the feedback causes a restoring torque that reduces the position error until the restoring torque balances the torque disturbance. Thus, the minimum current required to hold position will be used, resulting in continuous vernier control within the dynamic range and reducing power consumption.

Figure 3:
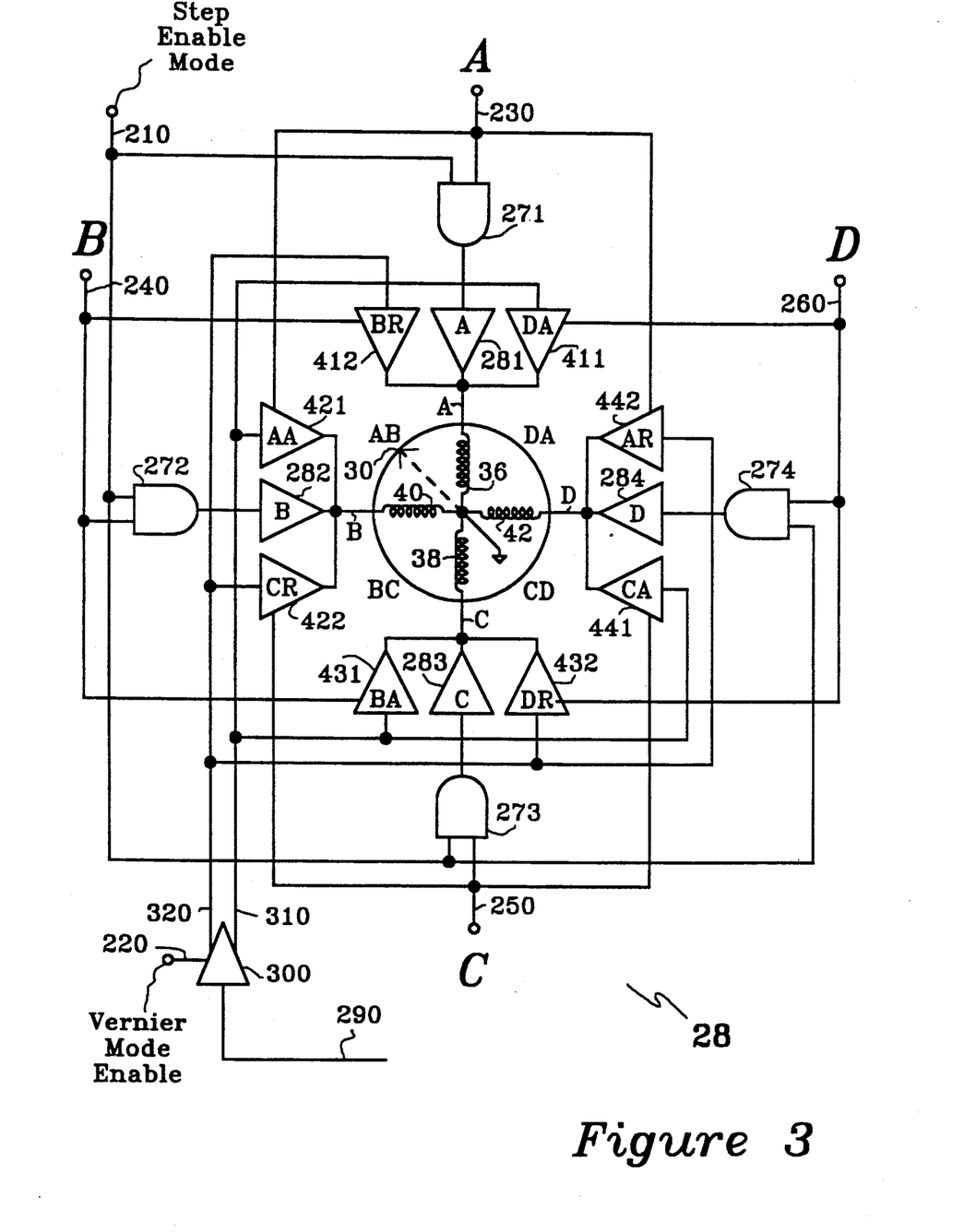
FIG. 3 is a schematic diagram illustrating details of the stepper motor control circuitry shown in FIG. 1.

Referring now to FIG. 3, a portion of stepper motor controller 28 is shown in more detail together with coils A, B, C, and D of stepper motor 18 to illustrate the operation of, and relationship between, the microstepping and vernier positioning modes of operation of stepper motor controller 28. The operation of stepper motor 18 is controlled primarily by seven signals applied to stepper motor controller 28 which combines these signals to apply currents to coils A, B, C, and/or D.

Step control mode 210 enables the stepping or microstepping operation of stepper motor controller 28 by enabling coil energization amplifiers 281, 282, 283, and 284 for operation by rotor position target selection lines 230, 240, 250, and 260 via AND gates 271, 272, 273, and 274.

For example, to achieve Target AB via microstepping operation, step control mode enable 210 and target selection lines 230 and 240 would be set, that is, driven by the combination of stepper motor controller 28 and drive processor 26 to a voltage representing a binary 1 in accordance with the logic in which the circuit is implemented. The ANDing of step mode enable 210 and target selection line 230 in AND gate 271 causes coil energization amplifier 281 to energize coil A. Similarly, the ANDing of step mode enable 210 and target selection line 240 in AND gate 272 causes coil energization amplifier 282 to energize coil B. As noted above, the energization of adjacent coils A and B orients rotor 30 to Target AB. All available full and microstep positions are achievable by the appropriate combination of rotor position target selection lines 230, 240, 250, and 260 and step control mode enable 210.

Servo enable 220 enables the vernier positioning operation of stepper motor controller 28 by enabling gated analog error buffer amplifier 300 which produces equal and opposite polarity advance and retard signals 310 and 320, respectively, in response to the magnitude of error signal 290. Advance signal 310 advances rotor 30 counterclockwise when positive while retard signal 320 retards rotor 30 when positive.

Rotor position target selection lines 230, 240, 250, and 260—in addition to their application to AND gates 271, 272, 273, and 274 for use during microstepping operations—are also applied to enable pairs of gated coil advance and retard amplifiers as follows. Target A selection line 230 is applied to gated coil A advance and retard amplifiers 421 and 442. Target B selection line 240 is applied to gated coil B advance and retard amplifiers 431 and 412. Target C selection line 250 is applied to gated coil C advance and retard amplifiers 441 and 422. Target D selection line 260 is applied to gated coil D advance and retard amplifiers 411 and 432.

Advance signal 310 is applied to coil advance amplifiers 411, 421, 431, and 441 to advance rotor 30 when positive while retard signal 320 is applied to retard amplifiers 421, 422, 432, and 442 to retard rotor 30 when positive. Advance and retard signals 310 and 320 do not affect these advance and retard amplifiers when negative.

To position rotor 30 in a vernier mode about Target AB, vernier control mode enable 220 and target selection lines 230 and 240 are set. If error signal 290 requires advancing rotor 30, the ANDing of positive advance signal 310 and target A selection line 230 in coil A advance amplifier 421 applies a current to coil B creating an advancing or counterclockwise torque to advance rotor 30. Similarly the ANDing of positive advance signal 310 and target B selection line 240 in coil B advance amplifier 431 applies a current to coil C causing a torque to advance rotor 30. Advancing rotor 30 about Target AB requires activation of coils B and C as may also be seen from inspection of Table 1 in which vernier control about Target AB—as shown for step 1—uses advance coil BC in accordance with the convention discussed above.

The same line of Table 1 indicates that vernier control about Target AB uses retard coil DA. If error signal 290 requires retarding rotor 30, the ANDing of positive retard signal 320 and target A selection line 230 in coil A retard amplifier 442 applies a current to coil D to cause a retarding or clockwise torque to retard rotor 30. Similarly the ANDing of positive retard signal 320 and target B selection line 240 in coil B retard amplifier 412 applies a current to coil A to cause a retarding torque to retard rotor 30.

Target selection lines 230, 240, 250, and 260 are used for microstepping as well as vernier control. During microstepping operations, step control mode enable 210 causes the application of target selection lines 230, 240, 250, and 260 to energize coils A, B, C, and D, respectively. During vernier control operations, servo enable 220 causes the application of target selection lines 230, 240, 250, and 260 to energize the advance or retard coils shown in Table 1 in accordance with the sign and magnitude of error signal 290.

Figure 4:
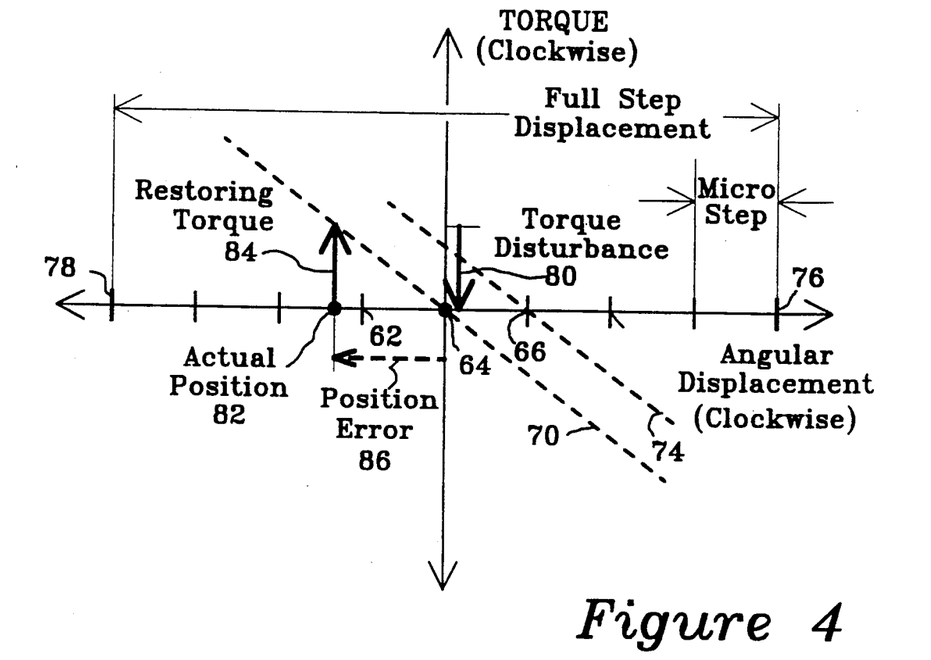
FIG. 4 is a set of torque versus displacement curves for a microstepping system illustrating the prior art problem of position error caused by a torque disturbance.

Referring now to FIG. 4, a set of torque versus displacement curves are shown for microstepping operation to better illustrate the problems of conventional microstepping systems. Torque is shown on the ordinate axis of the graph with clockwise torque indicated, for convenience, in the upward or positive direction and counterclockwise torque in the downward or negative direction. Angular displacement is shown on the abscissa, with clockwise displacement shown for convenience to the right and counterclockwise angular displacement to the left.

The desired angular displacements for a series of microsteps are shown as points 62, 64, and 66 with the origin of the graph shown for convenience at point 64, the desired rotor position. The torque versus displacement curve resulting from operation of the system to microstep to point 64 is shown as curve 70. In the absence of any torque disturbances applied to the rotor, microstepping operation in accordance with curve 70 would position the rotor at point 64. It should be noted that curve 70 passes through a torque null at the desired operating point, that is, at point 64.

The torque produced by a stepper motor is cyclical as a function of rotor displacement due to the periodic magnetic structure of the motor. In a permanent magnet stepper motor, torque versus displacement curves such as curves 70 and 74 are sinusoidal. Only the relatively linear portion of these curves near their respective torque nulls are shown for clarity. The maximum torque for each such curve is at the full step positions such as full step positions 76 and 78.

The curves illustrated in FIG. 4 will be used to describe two major limitations of conventional microstepping systems overcome by the present invention. The first limitation is that the rotor will be displaced from the desired position in the presence of a torque disturbance sufficiently to produce a restoring torque equal to the disturbing torque. As shown in the figure, the resultant position error may be larger than the magnitude of a microstep displacement. In addition, in microstepping operation, the current controllers must continuously apply full current to hold the microstep position.

In particular, in microstepping operation as depicted in FIG. 4, and in the absence of any torque disturbance, the rotor could be positioned at point 66 by shifting the torque null to point 66, that is, by shifting curve 70 clockwise to the position indicated by curve 74. Similarly, the rotor could be positioned at other microstepping points, such as point 62, by shifting the torque null to that point. In microstepping operation, torque nulls are shifted by changing the ratio of the currents in the coils located at full step positions, such as full step positions 76 and 78.

In practice, however, torque disturbances are applied to the rotor which displace the rotor from the desired position. For example, if equal currents are applied to coils at full step positions 76 and 78, the system would operate in accordance with curve 70 to attempt to position the rotor at point 64. A torque disturbance applied to the rotor, such as counterclockwise torque disturbance 80 shown slightly displaced from point 64 for clarity, would cause the rotor to move counterclockwise from the desired position at point 64 to a new position, such as actual position 82, at which restoring force 84 resulting from positioning the rotor away from the torque null of curve 70 at point 64 was sufficient to counterbalance counterclockwise torque disturbance 80.

In the presence of counterclockwise torque disturbance 80, the rotor is therefore actually positioned at point 82 at a substantial displacement from the desired position at point 64. The position error due to counterclockwise torque disturbance 80 is shown as counterclockwise position error 86 which, as shown, may be larger than a microstep displacement.

Figure 5:
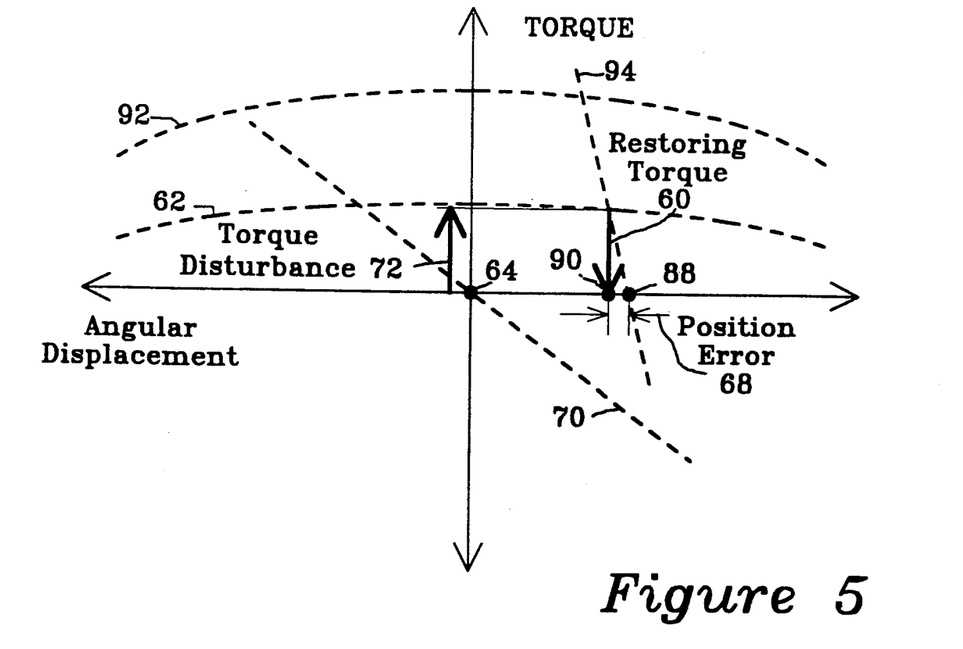
FIG. 5 is a set of torque versus displacement curves for vernier control illustrating the position error correcting response of the system to a torque disturbance and the reduced current requirement benefit of the present invention.

FIG. 5 is a series of torque versus displacement curves for vernier control operation illustrating the position error correcting response of the present system to a torque disturbance, and the reduced current requirement benefit, of the present invention. In operation of the present invention, the rotor is first positioned by microstepping to a microstep point near the final target position, such as microstep point 64, shown for convenience at the origin of the torque versus displacement graph shown in FIG. 5. As a result of microstepping operation, the rotor would be positioned at point 64 in accordance with curve 70, but subject to a position error resulting from any applied torque disturbance as discussed above with respect to FIG. 4.

At the time of transition from microstepping to vernier control operation, the currents applied to microstep the rotor to point 64 are switched off and a new set of currents are applied to provide vernier control to position the rotor to desired point 88. In the absence of any torque disturbance, the rotor would be positioned at desired point 88 and would remain there with only minimum current, if any, applied to the coils. In the presence of a torque disturbance such as clockwise torque disturbance 72, current is applied to the coils to produce a restoring counterclockwise torque. Torque-displacement curve 62 shows the relationship between torque and displacement for a particular current. It should be noted that there is no torque null in the vicinity of microstep point 64 or desired point 88. As the current applied to the coils is increased, the torque is increased. Torque-displacement curve 92 shows the torque versus displacement relationship for an arbitrary current larger than the current which produced torque-displacement curve 62. Rather than shifting the torque null to control position as is done in microstepping operation, the servo loop vernier control system, in response to position information feedback, controls the applied current to create restoring torque 60 to counterbalance torque disturbance 72. In particular, the minimum current necessary to produce restoring torque 60 is automatically selected by the operation of the servo system.

If the gain of the feedback control system is relatively high, position error if any, will be relatively small. For clarity, actual position 90 is shown displaced from desired point 88 by position error 68. The magnitude of position error 68 is a function of the gain of the vernier control servo system which may easily be controlled by amplification to reduce the error as required by the particular application of the stepper motor.

The slope of torque versus position error curve 94 indicates the gain of the servo system. The torque null of torque versus position error curve 94 is automatically located at desired point 88 which indicates that in the absence of a disturbing torque, minimum torque and therefore minimum current, if any, is required. In response to a torque disturbance, the restoring torque available in vernier control operation is a function of system gain so that the minimum current required is applied to maintain the desired position within any allowable position error.

In summary, during microstepping operation, the torque null of the torque versus position relation created by the application of full current to the coils is shifted to the desired microstep position by altering the ratio of currents applied to the coils. The slope of the torque-displacement curve is fixed so that a torque disturbance results in a proportional position error.

In vernier control operation, however, the applied currents create a torque maximum in the vicinity of the target position and the magnitude of the current is adjusted to the minimum necessary to produce the required restoring torque. The torque null of the torque versus position error relationship is therefore shifted to the desired position and the slope is a function of system gain so that the magnitude of position error may be controlled.

Both rotary stepper motors as described in detail herein, as well as linear step motor systems, may be operated in microstep and vernier control modes according to the present invention and are well suited to applications where vernier control is needed within periodic structures. The normal stepping mode is used to position the rotor at a fixed step target within the desired cycle, and then the vernier control mode is entered to achieve the necessary fine control. Track following servos in tape or disk drives, and mirror adjustors in optical resonators or in lasers, are examples of such applications.

The scope of the invention should, therefore, be determined with reference to the appended claims, along with the full scope of equivalents to which such claims are entitled.

What is claimed is:

1. A method of positioning a stepper motor, comprising the steps of:
   stepping the motor to a stepper motor target in the vicinity of a final target displaced therefrom; and then
   applying closed loop servo control to position the motor to achieve said final target.

2. The method of claim 1 wherein the step of applying servo control further comprises the step of:
   applying current substantially proportional to the difference between motor position and the final target to one or more stator coils in the stepper motor to move the motor from the stepper motor target to the final target.

3. A method of positioning a stepper motor, comprising the steps of:
   stepping the motor to the vicinity of a preliminary target; and then applying current substantially proportional to the difference between motor position and a final target to one or more stator coils in the stepper motor selected so that the final target is not at a torque null to position the motor to achieve the final target by closed loop servo control.

4. The method of claim 3 wherein the step of applying current further comprises the step of:
applying current to one or more stator coils selected so that the final target is in the vicinity of a torque maximum.

5. A method of positioning a stepper motor, comprising the steps of:
stepping the motor to the vicinity of a preliminary target; and then
applying current to one or more stator coils selected so that torque delivered by the stepper motor is substantially proportional to the difference between motor position and a final target to position the motor to achieve the final target by closed loop servo control.

6. The method of claim 5 wherein the step of applying current further comprises the step of:
applying current to one or more stator coils selected so that the final target is not at a torque null.

7. The method of claim 6 wherein the step of applying current further comprises the step of;
applying current to one or more stator coils selected so that the final target is in the vicinity of a torque maximum.

8. A method of positioning a stepper motor, comprising the steps of:
stepping the motor to the vicinity of a preliminary target;
de-energizing stator coils used to step the motor to the preliminary target; and then
applying closed loop servo control to position the motor to achieve a final target.

9. A stepper motor positioning system comprising:
a rotor;
a plurality of stator coils;
means for stepping the rotor to a stepper motor target by energizing one or more stator coils, said stepper motor target being displaced from a final target; and
means for applying closed loop servo control to position the rotor to said final target.

10. The positioning system of claim 9, wherein the closed loop servo control means further comprises:
means for applying current to one or more stator coils, said current being substantially proportional to the difference between the rotor position and said final target.

11. A stepper motor positioning system comprising:
a rotor;
a plurality of stator coils;
means for stepping the rotor to a preliminary target by energizing one or more stator coils, and
means for applying current to one or more stator coils to position the rotor to a final target by closed loop servo control, said current being substantially proportional to the difference between the rotor position and a final target, said one or more stator coils being selected so that the final position is not at a torque null.

12. The positioning system claimed in claim 11, wherein the means for applying current further comprises:
means for applying current to one or more stator coils selected so that the final target is in the vicinity of a torque maximum.

13. A stepper motor positioning system comprising:
a rotor;
a plurality of stator coils;
means for stepping the rotor to a preliminary target by energizing one or more stator coils, and
means for applying current to one or more stator coils to position the rotor to a final target by closed loop servo control, said one or more stator coils being selected so that the torque delivered to the rotor is proportional to the difference between the rotor position and the final target.

14. The positioning system claimed in claim 13, wherein the means for applying current further comprises:
means for applying current to one or more stator coils selected so that the final position is not at a torque null.

15. The positioning system claimed in claim 14, wherein the means for applying current further comprises:
means for applying current to one or more stator coils selected so that the final target is in the vicinity of a torque maximum.

16. A stepper motor positioning system comprising:
a rotor;
a plurality of stator coils;
means for stepping the rotor to a preliminary target by energizing one or more stator coils;
means for applying closed loop servo control to position the rotor to a final target;
a sensor linked for motion by the rotor;
data storage media including data indicating sensor position relative to the media; and
means for developing an error signal related to the difference between data detected by the sensor from the data storage media indicating sensor position relative to the media and the final target.

17. The positioning system claimed in claim 16 wherein the final target positions the sensor relative to the media to store or detect data therefrom unrelated to sensor position.

18. The positioning system claimed in claim 17 wherein the data storage media is magnetic media and the sensor is a read/write head associated with the magnetic media.

19. The positioning stem claimed in claim 18 wherein the magnetic media is a magnetic tape cartridge and the data detectable by the read/write head to indicate head position relative to the magnetic tape cartridge is contained in servo tracks prerecorded on the magnetic tape cartridge.

20. A stepper motor positioning system comprising:
a rotor;
a plurality of stator coils;
means for stepping the rotor to a preliminary target by energizing one or more stator coils;
means for applying closed loop servo control to position the rotor to a final target and for de-energizing stator coils used for stepping the rotor to the preliminary target, said means for de-energizing being operable before the rotor is positioned to the final target.

21. A method of positioning a stepper motor, comprising the steps of:

applying predetermined current to a stepper motor to position the motor at a stepper motor target in the vicinity of a final target displaced therefrom;

terminating the application of the predetermined current; and then applying current to the stepper motor proportional to the difference between the motor position and the final target.

22. A method of positioning a stepper motor, comprising the steps of:

applying a predetermined current to one or more stepper motor stator coils to position a stepper rotor at a predetermined preliminary target in the vicinity of a final target;

selecting one or more of said stator coils in which the torque characteristic in the vicinity of the final target is substantially at peak torque;

terminating the application of the predetermined current; and then applying current to each of the selected stator coils sufficient to position the rotor at the final target.

23. A method of positioning a read/write sensor head in a magnetic data storage system, comprising the steps of:

applying servo data to a magnetic data storage medium;

applying predetermined current to a stepper motor to position a read/write head in the vicinity of a target associated with the storage medium;

determining the position of the read/write head with respect to the target by reading the stored servo data with the read/write head;

terminating the application of the predetermined current; and applying current to the stepper motor proportional to the difference between the position of the read/write head and the target to control the position of the read/write head.

24. A stepper motor positioning system, comprising:

a stepper motor;

target means for generating a signal representing a target position;

first control means for applying predetermined current to position the stepper motor to the vicinity of the target position;

feedback means for generating a signal representing the position of the motor;

means for selecting one or more stator coils for which the torque characteristic in the vicinity of the target position is at peak torque; and second control means for terminating the application of the predetermined current and for applying current to position the motor at the target position.

25. A stepper motor positioning system, comprising:

a stepper motor rotor;

a plurality of stepper motor stator coils associated with the rotor;

first control means for applying a predetermined current to one or more of said stepper motor stator coils to position the stepper motor rotor at a stepper motor target in the vicinity of a desired target displaced therefrom;

servo means for generating an error signal proportional to the difference in position between the rotor and the desired target;

means for selecting stator coils in which the torque in the vicinity of the desired target is substantially at a peak value; and second control means for terminating the predetermined current and for applying current substantially proportional to the error signal to the selected stator coils.

26. A magnetic data storage system, comprising:

a magnetic data storage medium;

a read/write head associated with the data storage medium;

a stepper motor for positioning the read/write head with respect to the storage medium:

means for applying predetermined current to the stepper motor to position a read/write head in the vicinity of a target associated with the storage medium;

means for determining the position of the read/write head by reading data in the storage medium with the read/write head; and control means for terminating the application of the predetermined current and for applying current proportional to the difference between the position of the read/write head and the target to control the position of the read/write head.

27. A method of positioning a stepper motor, comprising the steps of:

stepping the motor to the vicinity of a preliminary target and then applying current to one or more stator coils in the motor to position the motor to achieve a final target, said stator coils being selected so that the final target is not at a torque null.

* * * * *